United States Patent
Argyle et al.

(10) Patent No.: US 9,022,357 B2
(45) Date of Patent: May 5, 2015

(54) AERIAL ROLLER SPACER APPARATUS AND ASSOCIATED METHODS THEREOF

(71) Applicant: Marmon Utility, LLC, Milford, NH (US)

(72) Inventors: Jared Argyle, Amherst, NH (US); Brian Boisclair, Goffstown, NH (US); Leonard Jean, Melbourne, FL (US); Edward Laughlin, Lowell, MA (US); Javier Philbrick, Nashua, NH (US)

(73) Assignee: Marmon Utility, LLC, Milford, NH (US)

( * ) Notice: Subject to any disclaimer, the term of this patent is extended or adjusted under 35 U.S.C. 154(b) by 0 days.

(21) Appl. No.: 14/084,052

(22) Filed: Nov. 19, 2013

(65) Prior Publication Data

US 2014/0138593 A1    May 22, 2014

Related U.S. Application Data

(60) Provisional application No. 61/728,424, filed on Nov. 20, 2012.

(51) Int. Cl.
| | |
|---|---|
| H02G 1/02 | (2006.01) |
| H02G 1/08 | (2006.01) |
| H02G 7/12 | (2006.01) |
| H02G 1/06 | (2006.01) |
| H02G 1/04 | (2006.01) |

(52) U.S. Cl.
CPC . *H02G 7/12* (2013.01); *H02G 1/06* (2013.01); *H02G 1/04* (2013.01)

(58) Field of Classification Search
CPC .......... B66D 3/06; B66D 3/046; B61B 13/04; B61B 12/002; B65G 9/002; H02G 7/12; H02G 1/04; H02G 1/06
USPC ...... 254/134.3 R, 134.5, 134.3 PA, 134.3 CL, 254/134.3 FT; 174/146, 41, 42, 40 R, 40 C; 269/289 MR
See application file for complete search history.

(56) References Cited

U.S. PATENT DOCUMENTS

| | | | |
|---|---|---|---|
| 1,747,388 A | * | 2/1930 | Pearson ........................ 105/153 |
| 2,820,083 A | | 1/1958 | Hendrix |
| 3,021,382 A | | 2/1962 | Horrocks et al. |
| 3,139,482 A | | 6/1964 | Peters et al. |
| 3,300,576 A | | 1/1967 | Hendrix et al. |
| 3,456,066 A | | 7/1969 | Petze, Jr. |
| 3,834,674 A | | 9/1974 | Jackson |
| 3,908,962 A | | 9/1975 | Ross |

(Continued)

FOREIGN PATENT DOCUMENTS

| | | |
|---|---|---|
| JP | 07-015817 | 1/1995 |
| JP | 10-290512 | 10/1998 |
| JP | 2004-034801 | 2/2004 |

*Primary Examiner* — Lee D Wilson
*Assistant Examiner* — Seahee Yoon
(74) *Attorney, Agent, or Firm* — Hayes Soloway PC

(57) ABSTRACT

An aerial roller spacer apparatus and related methods thereto are provided. The aerial roller spacer apparatus includes a spacer body. At least one saddle is formed on the spacer body. A spacer arm is connected to the spacer body at a first end, wherein the spacer arm extends away from the spacer body. A roller assembly is positioned proximate to a second end of the spacer arm, wherein the roller assembly has two rotatable roller halves that are removably engagable with one another with at least one fastener. A messenger groove is formed between the two rotatable roller halves.

20 Claims, 6 Drawing Sheets

(56) References Cited

U.S. PATENT DOCUMENTS

| | | | |
|---|---|---|---|
| 3,970,286 A * | 7/1976 | Ross | 254/134.3 R |
| 5,021,612 A | 6/1991 | Joffe | |
| 6,303,856 B1 | 10/2001 | Bello | |
| 7,419,136 B2 | 9/2008 | Marinez | |
| 7,874,543 B2 | 1/2011 | Theisen | |
| 2007/0284143 A1 | 12/2007 | Borges et al. | |
| 2009/0065750 A1 | 3/2009 | Theisen | |
| 2010/0000763 A1 | 1/2010 | Stansberry, Jr. | |
| 2010/0012351 A1 | 1/2010 | Boisclair | |
| 2012/0018690 A1 * | 1/2012 | Maire et al. | 254/413 |

* cited by examiner

100

| The aerial roller spacer apparatus is provided, the aerial spacer apparatus having a spacer body, at least one saddle formed on the spacer body, and a spacer arm connected to the spacer body at a first end and extending away from the spacer body at a second end | — 102 |

| A roller assembly is positioned on a messenger wire, wherein the roller assembly is connected to the second end of the spacer arm, and wherein the roller assembly has two rotatable roller halves engaged together and affixed to the second end of the spacer arm with a fastener | — 104 |

| The aerial roller spacer apparatus is moved along a length of the messenger wire | — 106 |

| The two rotatable roller haves are disengaged thereby moving the messenger wire into a messenger groove formed between the two rotatable roller halves | — 108 |

FIG. 6

AERIAL ROLLER SPACER APPARATUS AND ASSOCIATED METHODS THEREOF

CROSS REFERENCE TO RELATED APPLICATION

This application claims benefit of U.S. Provisional Application Ser. No. 61/728,424 entitled, "Aerial Roller Spacer Apparatus and Associated Methods Thereof" filed Nov. 20, 2012, the entire disclosure of which is incorporated herein by reference.

FIELD OF THE DISCLOSURE

The present disclosure is generally related to overhead transmission and distribution systems and more particularly is related to an aerial roller spacer apparatus and associated methods thereof used in overhead transmission and distribution systems.

BACKGROUND OF THE DISCLOSURE

Cables used in overhead transmission and distribution systems conventionally require a variety of devices for their installation and permanent retention on aerial fixtures. Often times, certain devices are used for installing the cables and then replaced with permanent fixtures which retain the cables for indefinite periods of time. The use of these installation and permanent retention components comes at a high cost to utility companies. These costs, coupled with the expense in man hours for installation of the cables adds significant costs to the operational budgets of the utility companies, which is passed along to the consumer in the form of higher utility bills.

One device that is conventionally used to retain cables in aerial positions is a cable spacer. The conventional cable spacer connects to a messenger wire or messenger cable and retains the cables in a suspended position below the messenger wire or messenger cable. Due to the elongate nature of the cable and the resulting weight of the cable, the spacers must be positioned at predetermined intervals along the cable path. The cable spacers are generally positioned at these predetermined intervals and then the cable is strung through each of the spacers. However, it is often difficult to move the cable through the spacers due to the frictional resistance of the cable along the spacer. Similarly, it is often difficult to reposition the spacer if needed, since the cables would need to be removed from the spacer before the spacer is detached from the messenger wire. This inflexibility of conventional spacers can add significantly to the already high costs of installing transmission and distribution cables.

Thus, a heretofore unaddressed need exists in the industry to address the aforementioned deficiencies and inadequacies.

SUMMARY OF THE DISCLOSURE

Embodiments of the present disclosure provide an apparatus and method for aerial roller spacer. Briefly described, in architecture, one embodiment of the system, among others, can be implemented as follows. An aerial roller spacer apparatus includes a spacer body. At least one saddle is formed on the spacer body. A spacer arm is connected to the spacer body at a first end, wherein the spacer arm extends away from the spacer body. A roller assembly is positioned proximate to a second end of the spacer arm, wherein the roller assembly has two rotatable roller halves that are removably engagable with one another with at least one fastener. A messenger groove is formed between the two rotatable roller halves.

The present disclosure can also be viewed as providing a roller assembly for use with an aerial spacer apparatus. Briefly described, in architecture, one embodiment of the assembly, among others, can be implemented as follows. The roller assembly includes a first rotatable roller half and a second rotatable roller half removably engagable with the first rotatable roller half. A messenger groove is formed between the first and second rotatable roller halves, wherein, when the first and second rotatable roller halves are in an engaged position, the messenger groove is closed and when the first and second rotatable roller halves are in an at least partially disengaged position, the messenger groove is at least partially open.

The present disclosure can also be viewed as providing a method of stringing and retaining a cable using an aerial cable spacer apparatus. In this regard, one embodiment of such a method, among others, can be broadly summarized by the following steps: providing the aerial roller spacer apparatus having a spacer body, at least one saddle formed on the spacer body, and a spacer arm connected to the spacer body at a first end and extending away from the spacer body; positioning a roller assembly on a messenger wire, wherein the roller assembly is connected to a second end of the spacer arm, and wherein the roller assembly has two rotatable roller halves engaged together and affixed to the second end of the spacer arm with a fastener; moving the aerial roller spacer apparatus along a length of the messenger wire, whereby the messenger wire contacts an exterior surface of the two rotatable roller halves; and disengaging the two rotatable roller halves, thereby moving the messenger wire into a messenger groove formed between the two rotatable roller halves.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a flowchart 100 illustrating a method of positioning an aerial roller spacer apparatus, in accordance with the first exemplary embodiment of the disclosure.

DETAILED DESCRIPTION

Figure 1:
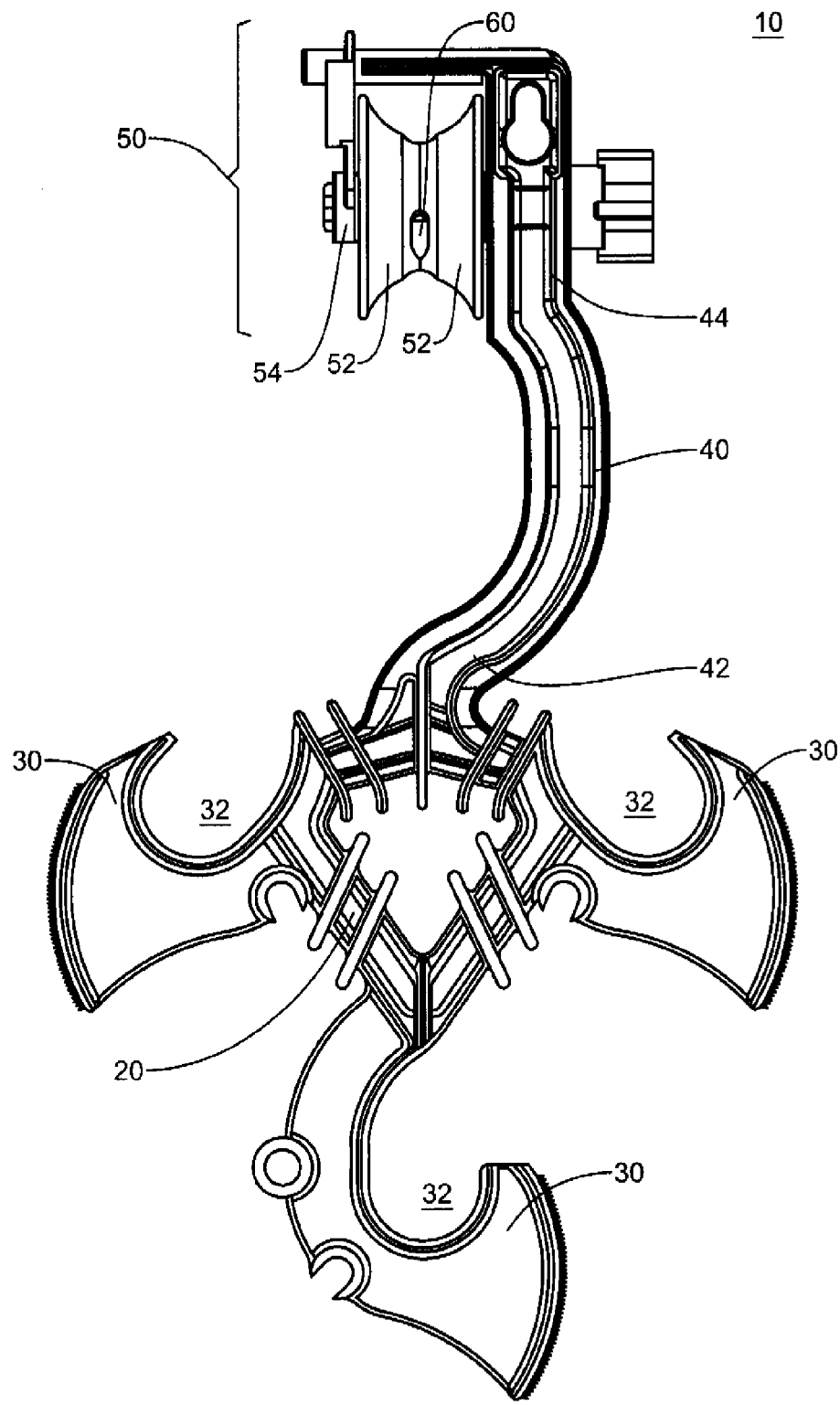
FIG. 1 is a side view illustration of an aerial roller spacer apparatus, in accordance with a first exemplary embodiment of the present disclosure.

FIG. 1 is a side view illustration of an aerial roller spacer apparatus 10, in accordance with a first exemplary embodiment of the present disclosure. The aerial cable spacer apparatus 10, which may be referred to herein simply as 'apparatus 10' includes a spacer body 20. At least one saddle 30 is formed on the spacer body 20. A spacer arm 40 is connected to the spacer body 20 at a first end 42 and extends away from the spacer body 20. A roller assembly 50 is positioned proximate to a second end 44 of the spacer arm 40. The roller assembly 50 has two rotatable roller halves 52 that are removably engagable with one another with at least one fastener 54. A messenger groove 60 is formed between the two rotatable roller halves 52.

The apparatus 10 may be used with stringing and retaining a cable, such as cable commonly used with utility transmission, distribution, or conduction. The apparatus 10 is used in connection with a durable wire structure that is used to support cable along a transmission and distribution system. Within the industry, the durable wire is commonly referred to as a messenger wire, a messenger cable, or a catenary (herein referred to as a 'messenger wire'). As is discussed herein, the apparatus 10 may move along the messenger wire and be secured to the messenger wire. When the apparatus 10 is moving along or secured to the messenger wire, the saddles 30 may be used to retain a quantity of cables below the messenger wire. A plurality of spacers 10 may be used in conjunction, thereby allowing for an elongate run of cable to be suspended from a length of messenger wire. It is noted that a variety of devices and components may be used with the apparatus 10 to facilitate movement of the cables within the saddles 30 or to retain the cables within the saddles 30.

The spacer body 20 of the apparatus 10 may have any size or configuration. As is shown in FIG. 1, the spacer body 20 may be a substantially triangular or diamond shape that is connected to the spacer arm 40 and that supports one or more saddles 30. The saddles 30 may be supported by the spacer body 20, such as by being affixed to the spacer body 20, or by being integrally attached to the spacer body 20. The saddles 30 may each include an interior area that forms a cable holding area 32. The cable holding area 32 may be characterized as the portion of the saddle 30 that receives a segment or portion of a cable that is being retained by the apparatus 10. The saddles 30 may also include any type of mechanism to help retain a cable within the saddle 30, such as a ratchet arm or similar structure, as is known in the art.

A spacer arm 40 may be connected to the spacer body 20 integrally or removably. Commonly the spacer arm 40 is integrally formed with the spacer body 20 at the first end 42 of the spacer arm 40. The spacer arm 40 extends away from the spacer body 20 towards a second end 44. The spacer arm 40, as shown, may include a curve or bend therein, which may be useful in rolling the apparatus 10 past stringing messenger clamps or similar structures. The size and dimensions of the spacer arm 40 may vary depending on the use of the apparatus 10.

The roller assembly 50 is positioned proximate to the second end 44 of the spacer arm 40 and may generally be affixed thereto. The roller assembly 50 includes various structures that allow the spacer body 20 to be movable along a length of the messenger wire, including two rotatable roller halves 52. The two rotatable roller halves 52 may each be substantially one half of a complete roller wheel, such that when the two rotatable roller halves 52 are engaged together, they form a complete roller wheel. The two rotatable roller halves 52 of the roller assembly 50 are engagable and disengagable with each other, thereby allowing for the formation of the complete roller wheel when the two rotatable roller halves 52 are engaged, as is shown in FIG. 1. When the two rotatable roller halves 52 are engaged together, the roller wheel formed may be capable of moving, i.e., rolling along a messenger wire. In this configuration, the apparatus 10 may be moved along any point of the messenger wire, such as a point along the messenger wire where it is desired for the apparatus 10 to be installed on the messenger wire.

The two rotatable roller halves may be affixed to the second end 44 of the spacer arm 40 with a fastener 54, such as a bolt-type fastener or other threaded bolt. In accordance with this disclosure, a bolt-type fastener may be a hardened bolt that is positioned axially through each of the two rotatable roller halves 52. The fastener 54 may be positioned through at least a portion of the second end 44 of the spacer arm 40. Formed between the two rotatable roller halves 52 is a messenger groove 60 which is sized to receive a portion of the messenger wire. When the two rotatable roller halves 52 are in a disengaged position, the messenger groove 60 may be considered an open groove, i.e., a groove that has a substantially open length, and when the two rotatable roller halves 52 are in an engaged position, the messenger groove 60 may be considered a closed groove, i.e., a groove that has a substantially closed length, such that the groove is accessible from a front and back but not from a side.

Figure 2:
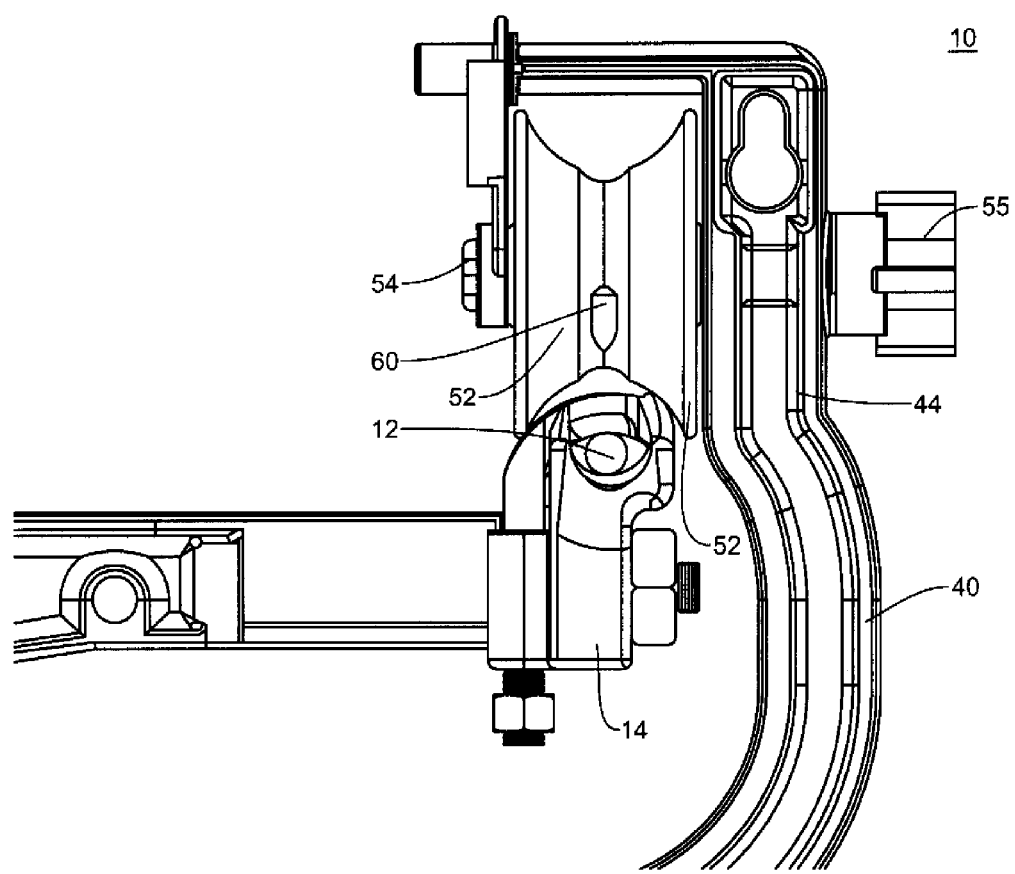
FIG. 2 is an enlarged view illustration of the aerial roller spacer apparatus of FIG. 1, in accordance with the first exemplary embodiment of the present disclosure.

FIG. 2 is an enlarged view illustration of the aerial roller spacer apparatus 10 of FIG. 1, in accordance with the first exemplary embodiment of the present disclosure. With reference to FIGS. 1-2, when the two rotatable roller halves 52 are at least partially disengaged from one another (FIG. 4), they may be moved apart from one another, thereby forming a gap therebetween. Disengagement of the two rotatable roller halves 52 may be accomplished by loosening the fastener 54 or with another device. In other words, the device that retains the two rotatable roller halves 52 in an engaged position may be the same fastener 54 that retains the two rotatable roller halves 52 to the second end 44 of the spacer arm 40, or it may be a different and distinct component used only to retain the two rotatable roller halves 52 together. When the two rotatable roller halves 52 are disengaged with the fastener 54, a receiver nut 55 may be threadably loosened from an end of the fastener 54.

As is shown in FIG. 2, the two rotatable roller halves 52 are in the engaged position and fastened to the second end 44 of the spaced arm 40 with the fastener 54. The messenger groove 60 is closed between the engaged two rotatable roller halves 52. In this configuration, the apparatus 10 is being depicted as it is moving along the length of a messenger wire 12. In FIG. 2, the messenger wire 12 is depicted being retaining within a stringing messenger clamp 14, which is a device commonly used to retain the messenger wire 12 to a transmission pole, or other supporting structure. As the apparatus 10 is moved along the length of the messenger wire 12, it may easily roll over stringing messenger clamps 14 and other devices affixed to the messenger wire 12, thereby allowing the apparatus 10 to move along the length of the messenger wire 12 without obstruction. The curve within the spacer arm 40 may allow for appropriate clearance between the stringing messenger clamp 14 and the spacer arm 40.

As can be seen in FIG. 2, the messenger groove 60 is shown as a closed groove, in that only the front and back of the groove are accessible. The two rotatable roller halves 52 may be at least partially disengaged to form a gap between the two rotatable roller halves 52. When this gap is larger than the width of the messenger wire, the apparatus 10 may move downwards thereby lodging the messenger cable between the two rotatable roller halves 52 and into a messenger groove 60 formed between the two rotatable roller halves 52. Once the messenger cable is positioned within the messenger groove 60, a fastener may be used to compress the two rotatable roller halves 52 together to frictionally clamp the messenger wire within the messenger groove 60 and prevent the two rotatable roller halves 52 from further turning. In this position, the apparatus 10 may be secured to the messenger wire indefinitely, such that it can be used to retain cables in an aerial position.

Figure 3:
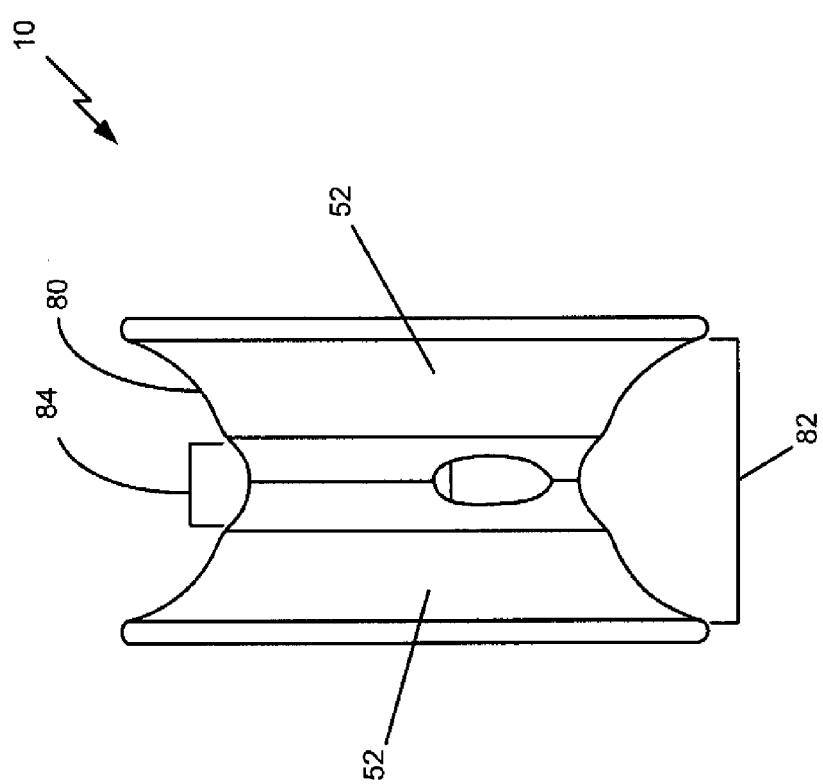
FIG. 3 is a front view illustration of the two rotatable roller halves of FIG. 2, in accordance with the first exemplary embodiment of the present disclosure.

FIG. 3 is a front view illustration of the two rotatable roller halves 52 of FIG. 2, in accordance with the first exemplary embodiment of the present disclosure. The shape of the two rotatable roller halves 52 may vary depending on the intended use of the apparatus 10. For example, The two rotatable roller halves 52 may have exterior cylindrical walls 80 with at least a first indented area 82. The first indented area 82 is sized to receive a portion of a stringing messenger clamp 14 (FIG. 2), namely the top portion of the stringing messenger clamp that the two rotatable roller halves 52 will traverse over as the apparatus 10 is moved along a messenger wire. The two rotatable roller halves 52 may also include a second indented area 84 formed on the exterior cylindrical walls 80 of the two rotatable roller halves 52. The second indented area 84 may have a width that is less than a width of the first indented area 82. The second indented area 84 may be sized to receive a portion of a messenger wire. In other words, when the apparatus 10 is moved along the messenger wire, the messenger wire may sit within the second indented area 84.

Figure 4:
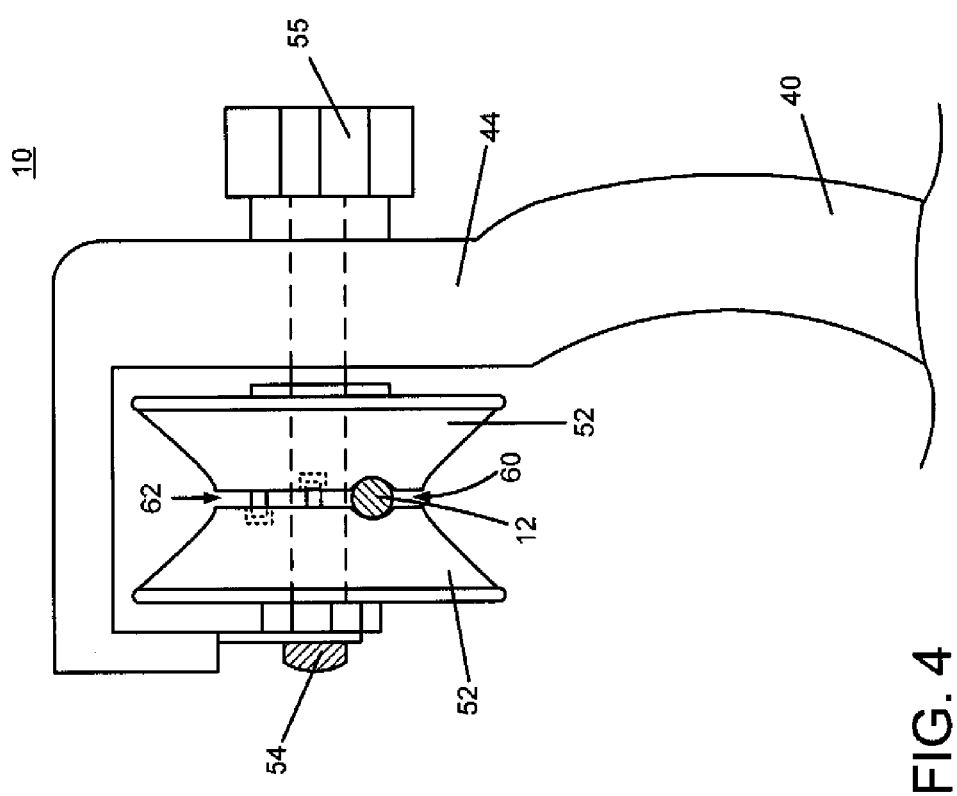
FIG. 4 is an enlarged view illustration of the aerial roller spacer apparatus of FIG. 2, in accordance with the first exemplary embodiment of the present disclosure.

FIG. 4 is an enlarged view illustration of the aerial roller spacer apparatus 10 of FIG. 2, in accordance with the first exemplary embodiment of the present disclosure. In particular, FIG. 4 depicts the apparatus 10 in a fixture position on the messenger wire 12, where the messenger wire 12 is frictionally retained within the messenger groove 60. To achieve this position, starting with the two rotatable roller halves 52 in the engaged position and sitting on top of the messenger wire 12, the fastener 54 is loosened to allow the two rotatable roller halves 52 to become disengaged, yet still connected to the second end 44 of the spacer arm 40 with the fastener 54.

As the two rotatable roller halves 52 are disengaged from each other, a gap 62 will form between the two rotatable roller halves 52, and as soon as the gap 62 is larger than the width of the messenger wire 12, the weight of the apparatus 10 will force the apparatus 10 downwards, thereby lodging the messenger wire 12 within the messenger groove 60. When the messenger wire 12 is within the messenger groove 60, the fastener 54 may be tightened to frictionally retain the messenger wire 12 within the messenger groove 60 and prevent the two rotatable roller halves 52 from further turning. When the messenger wire 12 is frictionally retained within the messenger groove 60, the apparatus 10 may be positioned on the messenger wire 12 in a substantially immovable state. Thus, two rotatable roller halves 52 and other components of the apparatus 10 allow the apparatus to be used for both stringing a cable along a messenger wire 12 and with substantially permanently supporting the cable in place on the messenger wire 12 after the apparatus 10 has reached the desired position.

Figure 5:
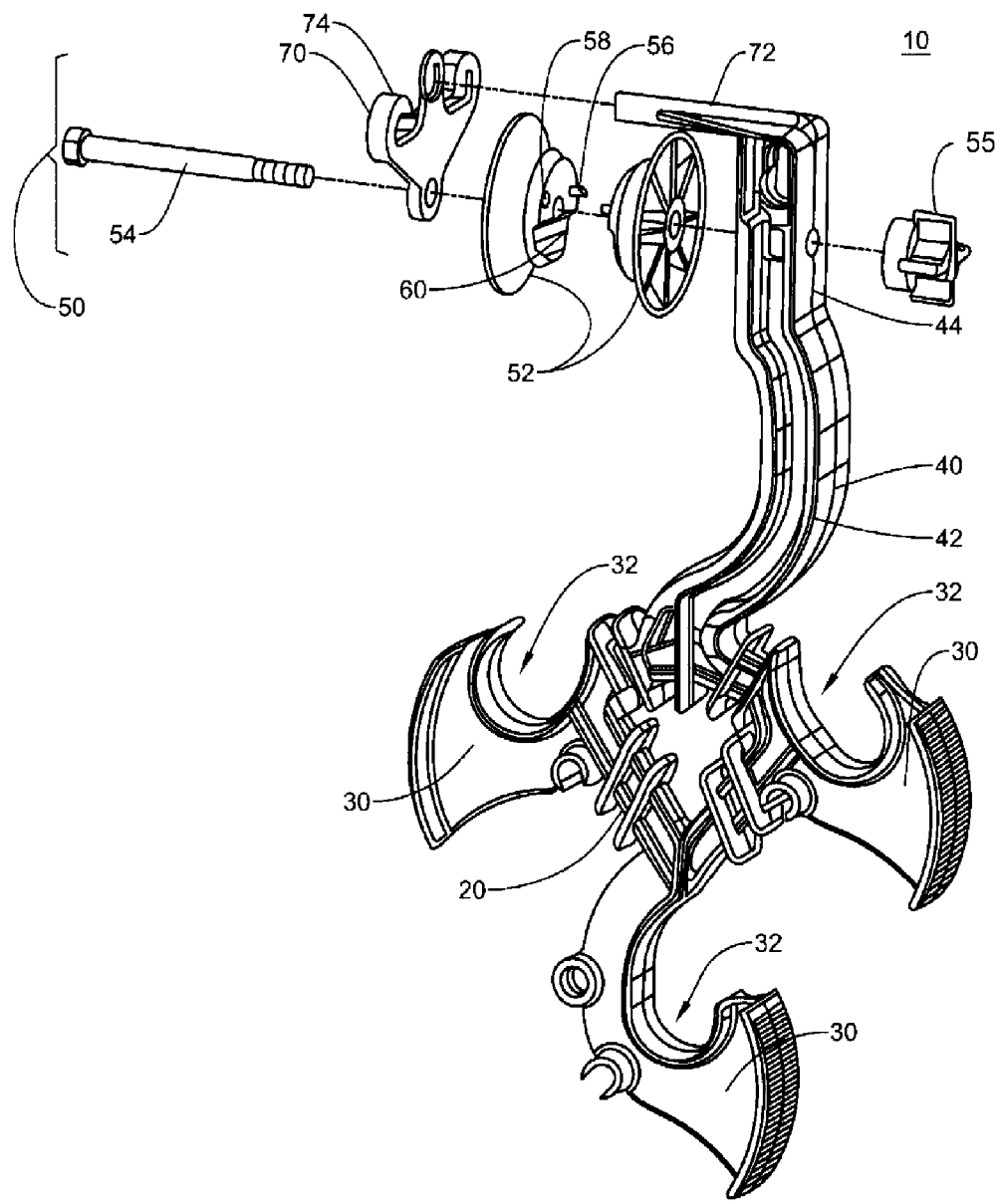
FIG. 5 is an exploded view illustration of the aerial roller spacer apparatus of FIG. 1, in accordance with the first exemplary embodiment of the present disclosure.

FIG. 5 is an exploded view illustration of the aerial roller spacer apparatus 10 of FIG. 1, in accordance with the first exemplary embodiment of the present disclosure. In addition to the spacer body 20, the saddles 30, and the spacer arm 40, the various components of the roller assembly 50 are shown in detail, including the two rotatable roller halves 52 and the fastener 54. Also shown, and optionally included with the roller assembly 50, are a tag-line cleat 70 and a roller assembly support arm 72. The roller assembly support arm 72 may extend from the second end 44 of the spacer arm 40 laterally past the two rotatable roller halves 52 in a positioned above the two rotatable roller halves 52, thereby providing a supporting structure for the tag-line cleat 70. The tag-line cleat 70 may connect to the fastener 54 proximate to the two rotatable roller halves 52, thereby providing additional structural support for the two rotatable roller halves 52. Additionally, the tag-line cleat 70 may have an attachment structure 74 which can be used to affix a tag-line to, thereby allowing the apparatus 10 to be pulled along the messenger wire.

The fastener 54 depicted in FIG. 5 may include a bolt and threaded receiver nut 55. It may be preferable for the receiver nut to be a hand nut, such that a user can loosen the receiver nut without the use of tools. This functionality allows a user to quickly loosen the fastener 54 to easily and conveniently disengage the two rotatable roller halves 52 to allow the messenger wire to be positioned within the messenger groove 60. As can be seen in FIGS. 4-5, the two rotatable roller halves 52 may each include protrusions 56 and holes 58 that are aligned for engagement, respectively. This configuration of protrusions 56 and holes 58 may be arranged to allow for the protrusions of one of the two rotatable roller halves 52 to enter the hole 58 positioned on the other rotatable roller half 52. Thus, when the two rotatable roller halves 52 are engaged together, the protrusions 56 and holes 58 may prevent the two rotatable roller halves from becoming axially unaligned. When the two rotatable roller halves 52 are at least partially disengaged, the gap may be formed therebetween, and the protrusions 56 and holes 58 may be separated partially or fully. In other words, the protrusions 56 may be sized to be longer than a thickness of the messenger wire 12 (FIG. 4), thereby allowing them to remain at least partially within the holes 58 even when the two rotatable roller halves 52 are partially disengaged.

FIG. 6 is a flowchart 100 illustrating a method of positioning an aerial roller spacer apparatus, in accordance with the first exemplary embodiment of the disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, the aerial roller spacer apparatus is provided, the aerial spacer apparatus having a spacer body, at least one saddle formed on the spacer body, and a spacer arm connected to the spacer body at a first end and extending away from the spacer body at a second end. A roller assembly is positioned on a messenger wire, wherein the roller assembly is connected to the second end of the spacer arm, and wherein the roller assembly has two rotatable roller halves engaged together and affixed to the second end of the spacer arm with a fastener (block 104). The aerial roller spacer apparatus is moved along a length of the messenger wire (block 106). The two rotatable roller halves are disengaged thereby moving the messenger wire into a messenger groove formed between the two rotatable roller halves (block 108).

The method may include any additional number of steps, processes, or functions, including any disclosed relative to FIGS. 1-5 herein. For example, the two rotatable roller halves may be fastened together after the messenger wire is moved into the messenger wire groove, thereby securing the aerial roller spacer apparatus to the messenger wire. Fastening the two rotatable roller halves together may include aligning a protrusion on a first of the two roller halves with hole on a second of the two roller halves. The fastener may be secured to the spacer arm with a receiver nut. When the two rotatable roller halves are at least partially disengaged, the receiver nut may be at least partially loosened from the fastener, thereby allowing the two rotatable roller halves to at least partially separate. To move the apparatus along the messenger wire, a tag line may be connected to a tag line cleat positioned proximate to the roller assembly.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An aerial roller spacer apparatus having a messenger wire clamping roller assembly, comprising:
    a spacer body;
    at least one saddle formed on the spacer body;
    a spacer arm connected to the spacer body at a first end, wherein the spacer arm extends away from the spacer body; and,
    a roller assembly positioned proximate to a second end of the spacer arm, wherein the roller assembly has two rotatable roller halves with a messenger groove formed in an interior facing portion of said roller halves transverse to the axis of rotation of said roller halves to engage a messenger wire in said messenger groove, said roller halves being removably engagable with one another with at least one fastener to clamp said messenger groove about said messenger wire.

2. The aerial roller spacer apparatus of claim 1, further comprising at least one protrusion positioned on one of the two rotatable roller halves and at least one hole positioned on another of the two rotatable roller halves, wherein the at least one protrusion is positioned within the at least one hole to maintain alignment of the rotatable roller halves.

3. The aerial roller spacer apparatus of claim 1, wherein the at least one fastener controls an engagement of the two rotatable roller halves, wherein in a disengaged position, the messenger groove further comprises an open groove, and in an engaged position, the messenger groove further comprises a closed groove.

4. The aerial roller spacer apparatus of claim 1, wherein the at least one fastener further comprises a bolt-type fastener positioned axially through each of the two rotatable roller halves.

5. The aerial roller spacer apparatus of claim 4, wherein the bolt-type fastener is positioned through at least a portion of the second end of the spacer arm.

6. The aerial roller spacer apparatus of claim 5, further comprising a receiver nut engaged with an end of the bolt-type fastener.

7. The aerial roller spacer apparatus of claim 1, wherein the two rotatable roller halves have exterior cylindrical walls with at least a first indented area, wherein the first indented area is sized to receive a portion of a stringing messenger clamp.

8. The aerial roller spacer apparatus of claim 7, further comprising a second indented area formed on the exterior cylindrical walls of the two rotatable roller halves, wherein the second indented area has a width that is less than a width of the first indented area, wherein the second indented area is sized to receive a portion of a messenger wire.

9. The aerial roller spacer apparatus of claim 1, further comprising a roller assembly support arm connected to the second end of the spacer arm, wherein the roller assembly support arm extends from the second end of the spacer arm in a position above the roller assembly.

10. The aerial roller spacer apparatus of claim 9, further comprising a tag line cleat connected between the roller assembly support arm and a side of the roller assembly, wherein the roller assembly is positioned between the second end of the spacer arm and the tag line cleat.

11. The aerial roller spacer apparatus of claim 10, wherein the tag line cleat further comprises at least one attachment structure for connecting a tag line to the tag line cleat.

12. A roller assembly for use with an aerial spacer apparatus for the releasable engagement of a messenger wire, the roller assembly comprising:
    a first rotatable roller half;
    a second rotatable roller half removably engagable with the first rotatable roller half; and
    a messenger groove formed between the first and second rotatable roller halves, wherein, when the first and second rotatable roller halves are in an engaged position, the messenger groove is closed and clamps about said messenger wire and when the first and second rotatable roller halves are in an at least partially disengaged position, the messenger groove is at least partially open to permit the movement of said messenger wire through said roller halves.

13. A method of clamping an aerial roller spacer apparatus to a messenger wire, the method comprising the steps of:
    providing the aerial roller spacer apparatus having a spacer body, at least one saddle formed on the spacer body, and a spacer arm connected to the spacer body at a first end and extending away from the spacer body;
    positioning a roller assembly on a messenger wire, wherein the roller assembly is connected to a second end of the spacer arm, and wherein the roller assembly has two partially separable rotatable roller halves and a messenger wire groove therebetween, the partially separable rotatable roller halves releasably engaged together and affixed to the second end of the spacer arm with a fastener;
    moving the aerial roller spacer apparatus along a length of the messenger wire, whereby the messenger wire contacts an exterior surface of the two rotatable roller halves;
    disengaging the two rotatable roller halves so as to allow the two roller halves to separate for, moving the messenger wire through the messenger wire groove formed between the two rotatable roller halves; and,
    engaging the two partially separable rotatable roller halves so as to clamp the messenger wire in the messenger wire groove.

14. The method of claim 13, wherein the engaging step includes fastening the two partially separable rotatable roller halves together after the messenger wire is moved into the messenger wire groove, thereby securing the aerial roller spacer apparatus to the messenger wire.

15. The method of claim 14, wherein the step of fastening the two partially separable rotatable roller halves together further comprising aligning a protrusion on a first of the two roller halves with a hole on a second of the two roller halves.

16. The method of claim 13, further comprising the step of securing the fastener to the spacer arm with a receiver nut.

17. The method of claim 16, wherein the step of disengaging the two partially separable rotatable roller halves further comprises loosening the receiver nut on the fastener, thereby allowing the two rotatable roller halves to at least partially separate.

18. The method of claim 13, further comprising the step of supporting the roller assembly with a roller assembly support arm, wherein the roller assembly support arm is connected to the second end of the spacer arm and extends from the second end of the spacer arm to a position above the roller assembly.

19. The method of claim 13, further comprising the step of moving the aerial roller spacer apparatus with a tag line, wherein the tag line is connectable to a tag line cleat positioned proximate to the roller assembly.

20. The method of claim 13, wherein the step of moving the aerial roller spacer apparatus along the length of the messenger wire further comprises rotating the two rotatable roller halves on a bolt-type fastener positioned axially through each of the two rotatable roller halves.

* * * * *